United States Patent [19]

Bierer

[11] 4,045,044

[45] Aug. 30, 1977

[54] PATIENT TRANSPORT WITH OXYGEN SUPPLY

[76] Inventor: William F. Bierer, 769 Glenmont, Los Angeles, Calif. 90024

[21] Appl. No.: 608,525

[22] Filed: Aug. 28, 1975

[51] Int. Cl.[2] .............................................. B60D 7/08

[52] U.S. Cl. .......................... 280/87.02 R; 128/142.4; 128/203; 297/DIG. 4; 297/188; D12/133

[58] Field of Search ................ 280/87.02 R, 87.02 W, 280/47.38; 297/188, 5, 194, 338, 337, DIG. 4; 5/92; 128/188, 203, 142 R, 142.4; 296/20; 269/322; D12/131, 133

[56] References Cited

U.S. PATENT DOCUMENTS

| | | | |
|---|---|---|---|
| 2,866,495 | 12/1958 | Diehl et al. | 297/DIG. 4 |
| 3,338,628 | 8/1967 | Evans | 297/188 |
| 3,704,025 | 11/1972 | Cerveny | 280/41 A |
| 3,761,968 | 10/1973 | Besler | 5/92 |
| 3,838,687 | 10/1974 | Mosher | 128/188 |

*Primary Examiner*—Robert R. Song
*Assistant Examiner*—John A. Pekar
*Attorney, Agent, or Firm*—Christie, Parker & Hale

[57] ABSTRACT

A patient transport has a tubular frame, a plurality of wheels attached to the frame to permit movement thereof, a pair of oxygen bottles held on opposite sides of the frame, and a patient's seat attached to the frame between the oxygen bottles. Preferably, the oxygen bottles are in an upright position with their centers of gravity below and approximately in the same vertical plane as the loaded center of gravity of the transport.

11 Claims, 1 Drawing Figure

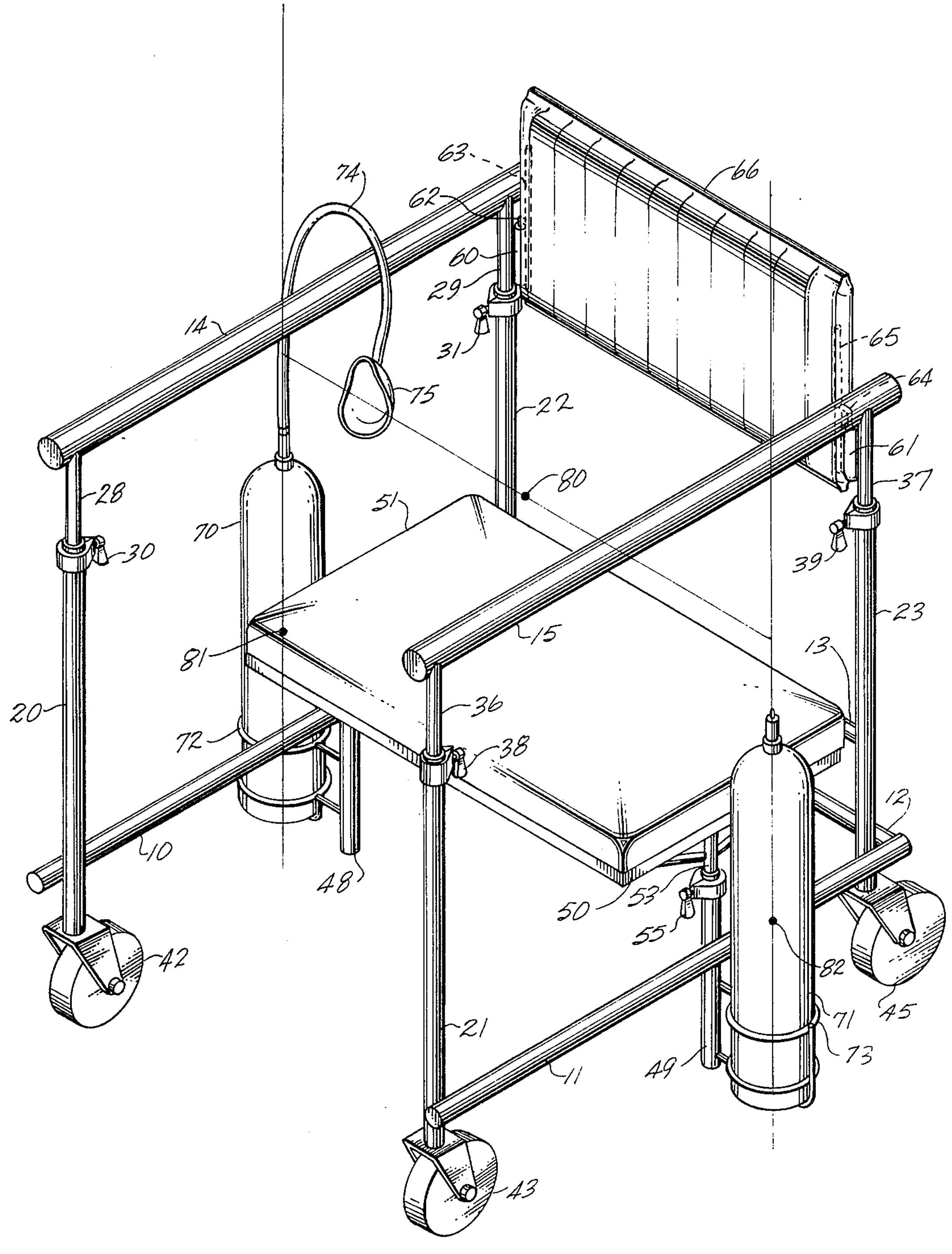
74
63
62
66
60
29
14
31
65
75
64
22
61
28
80
37
51
70
30
39
23
15
81
13
20
36
72
38
12
10
48
50
53
55
42
82
45
21
71
73
49
11
43

PATIENT TRANSPORT WITH OXYGEN SUPPLY

BACKGROUND OF THE INVENTION

This invention relates to medical patient care equipment and, more particularly, to a patient transport with oxygen supply.

A patient walker enables persons under medical care who are not ambulatory to move about. Typically, a patient walker comprises a box-shaped tubular frame having a front, a back, and two sides, wheels attached to the bottoms of vertical members located at the four corners of the frame, and a seat located within the frame. The patient sits on the seat with his feet extending to the floor, and propels himself across the floor by moving his legs back and forth in a walking motion. Patient walkers must be carefully designed for stability; if the walker tips over in use, the patient may be seriously injured.

A patient walker can be an important part of the recuperation process of a person under medical care, both physically and psychologically, because of the opportunity it affords for exercise and mobility. Heretofore, the benefits of a patient walker have been denied to persons in need of continuous oxygen therapy.

SUMMARY OF THE INVENTION

According to the invention, a patient transport comprises a tubular frame, a plurality of wheels attached to the frame to permit movement thereof, a pair of oxygen bottles held on opposite sides of the frame, and a patient support attached to the frame between the oxygen bottles. As a result, the oxygen bottles are balanced and do not adversely affect the stability of the walker.

In the preferred embodiment, the patient transport is a walker, the tubular frame has vertical members at its four corners to which the wheels are attached, and the patient support comprises a horizontal seat within the frame and a vertical back rest extending along the back of the frame. The oxygen bottles are held in an upright position with their centers of gravity below and approximately in the same vertical plane as the loaded center of gravity of the transport, to add further stability to the transport.

BRIEF DESCRIPTION OF THE DRAWING

The features of a specific embodiment of the best mode contemplated of carrying out the invention are illustrated in the drawing, the single FIGURE of which is a perspective view of a patient walker with oxygen supply constructed in accordance with the principles of the invention.

DETAILED DESCRIPTION OF THE SPECIFIC EMBODIMENT

In the drawing, horizontal tubular metal members 10, 11, 12, 13, 14, and 15, and vertical tubular metal members 20, 21, 22, and 23 comprise the box-shaped tubular frame of a patient walker. The ends of member 12 are welded to the back of members 10 and 11, respectively. Near the bottom, members 20 and 22 are welded to opposite ends of member 10. Near the bottom, members 21 and 23 are welded to opposite ends of member 11. Member 14 is attached to members 20 and 22 by tubular metal sections 28 and 29 that fit into the top ends of members 20 and 22, respectively. Sections 28 and 29 are welded to member 14 near opposite ends thereof and are secured within members 20 and 22, respectively, by clamps 30 and 31, respectively. The height of member 14 is adjusted by raising sections 28 and 29 partially out of the ends of members 20 and 22, respectively, and then tightening clamps 30 and 31. Member 15 is attached to members 21 and 23 by tubular metal sections 36 and 37 that fit into the top ends of members 21 and 23, respectively. Sections 36 and 37 are welded to member 15 near opposite ends thereof and are secured within members 21 and 23, respectively, by clamps 38 and 39, respectively. The height of member 15 is adjusted by raising sections 36 and 37 partially out of the ends of members 21 and 22, respectively, and then tightening clamps 38 and 39.

As illustrated in the drawing, vertical members 20 through 23 are located at the four corners of the tubular frame such that members 20 and 21 are at the front of the frame, members 22 and 23 are at the back of the frame, members 20 and 22 are on one side of the frame, and members 21 and 23 are on the opposite side of the frame.

Wheels 42, 43, 44, and 45 are attached to the bottom of members 20, 21, 22, and 23, respectively, to permit movement of the frame. (Wheel 44 is not shown in the drawing.)

Vertical tubular metal members 48 and 49 are welded to members 10 and 11, respectively. A horizontal plate 50 and a cushion 51 provide a patient seat. Plate 50 is attached to vertical members 48 and 49 by tubular sections 52 and 53, respectively, that fit into the top ends of members 48 and 49, respectively. Sections 52 and 53 are welded to the bottom of plate 50 near opposite sides thereof and are secured within members 48 and 49, respectively, by clamps 54 and 55, respectively. The height of the seat is adjusted by raising sections 52 and 53 partially out of the ends of members 48 and 49, respectively, and then tightening clamps 54 and 55, respectively. As illustrated in the drawing, the seat is located within the tubular frame, and between the sides of the tubular frame. (Section 52 and clamp 54 are not shown.)

Metal tubes 60 and 61 are welded to the tops of sections 29 and 37, respectively. A metal rod 62, which is bent and welded at one end to a metal rod 63, extends into tube 60. Similarly, a metal rod 64, which is bent and welded at one end to a metal rod 65, extends into tube 61. A piece of fabric 66 is supported by rods 63 and 65 in a vertical plane lying along the back of the frame to provide a patient backrest. The backrest and seat together comprise the patient support in this embodiment.

In use, the patient sits on cushion 51 with his feet extending to the floor. The patient propels himself by moving his legs back and forth in a walking motion, and can use members 14 and 15 for arm support. A patient walker must be carefully designed to provide stability. If the walker is imbalanced, it may tip over in use and injure the patient.

A pair of oxygen bottles 70 and 71 are held on opposite sides of the tubular frame in an upright position by baskets 72 and 73, respectively, which are welded to members 48 and 49, respectively. Baskets 72 and 73 are constructed of metal rods bent to receive a cylinder having the diameter of bottles 70 and 71. As shown in the drawing, baskets 72 and 73 are attached to the opposite sides of the tubular frame outboard thereof and the patient's seat is attached to the tubular frame between baskets 72 and 73. Thus, bottles 70 and 71 are balanced on opposite sides of the patient when the walker is in use, so its stability is not impaired. A pressure regulator, not shown, controls the flow of oxygen from one of the bottles, shown as bottle 70, through a tube 74 to a mask 75 through which the oxygen is supplied to the patient using the walker.

The approximate loaded center of gravity of the walker, i.e., the center of gravity of the walker when a patient is sitting on the seat, is indicated by a point 80. The approximate center of gravity of bottles 70 and 71 are indicated by points 81 and 82, respectively. As illustrated in the drawing, baskets 72 and 73 are positioned to hold the centers of gravity of bottles 70 and 71 below the loaded center of gravity of the walker. In other words, baskets 72 and 73 are located below plate 50. Consequently, the resultant center of gravity of the walker including the oxygen supply is lowered, thereby improving the stability of the walker in use. As further illustrated in the drawing, baskets 72 and 73 are also positioned so the centers of gravity of bottles 70 and 71 lie approximately in the same vertical plane as the loaded center of gravity of the walker. In other words the patient's seat is directly between baskets 72 and 73. This further improves the stability of the walker in use.

The described embodiment of the invention is only considered to be preferred and illustrative of the inventive concept; the scope of the invention is not to be restricted to such embodiment. Various and numerous other arrangements may be devised by one skilled in the art without departing from the spirit and scope of this invention.

What is claimed is:

1. A patient transport comprising:

a tubular frame including two oppositely disposed sides;

a plurality of wheels attached to the frame to permit movement thereof;

first and second means for holding a pair of oxygen bottles on the respective two oppositely disposed sides of the frame outboard of the sides of the frame; and horizontally extending patient support means attached to the frame between the first and second holding means, the first and second holding means lying below the horizontally extending patient support means.

2. The transport of claim 1, in which the holding means each comprise a rod basket welded to the frame.

3. The transport of claim 2, in which the tubular frame has four corners at which vertical members are located, the wheels are attached on the bottom ends of the vertical members.

4. The transport of claim 3, in which the support means comprises a horizontal seat located within the tubular frame, and a vertical back.

5. The transport of claim 1, in which the first and second holding means are oriented to hold the oxygen bottles in an upright position.

6. The transport of claim 1, in which the holding means each comprise a rod basket welded to the frame.

7. The transport of claim 1, in which the tubular frame has four corners at which vertical members are located, the wheels are attached on the bottom ends of the vertical members.

8. The transport of claim 1, in which the support means comprises a horizontal seat located within the tubular frame, and a vertical back.

9. A patient walker comprising:

a box-shaped frame;

a plurality of wheels attached to the frame to permit movement thereof;

a patient seat including a horizontal patient supporting surface disposed within and attached to the frame;

a pair of oxygen bottles and means for supporting the pair of oxygen bottles on opposite sides of the frame outboard of the frame.

10. The patient walker of claim 9, in which the supporting means comprises means for holding the bottles in an upright position.

11. A patient walker comprising:

a box-shaped frame;

a plurality of wheels attached to the frame to permit movement thereof;

a patient seat including a horizontal patient supporting surface disposed within and attached to the frame;

a pair of oxygen bottles; and means for supporting the pair of oxygen bottles on opposite sides of the frame in an upright position.

* * * * *